(12) United States Patent
Oohashi et al.

(10) Patent No.: US 6,838,805 B2
(45) Date of Patent: Jan. 4, 2005

(54) ROTARY ELECTRIC MACHINE

(75) Inventors: Atsushi Oohashi, Tokyo (JP);
Katsuhiko Kusumoto, Tokyo (JP);
Hideki Morikaku, Tokyo (JP);
Yoshinobu Utsumi, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 141 days.

(21) Appl. No.: 10/218,115

(22) Filed: Aug. 14, 2002

(65) Prior Publication Data

US 2003/0048035 A1 Mar. 13, 2003

(30) Foreign Application Priority Data

Aug. 17, 2001 (JP) ..................................... P.2001-247612

(51) Int. Cl.$^7$ ................................................. H02K 1/22
(52) U.S. Cl. ......................................... 310/261; 310/89
(58) Field of Search ............................ 310/261, 89, 91, 310/254

(56) References Cited

U.S. PATENT DOCUMENTS

| | | | |
|---|---|---|---|
| 3,589,485 A | * | 6/1971 | Kajitani et al. ........... 192/18 B |
| 4,201,930 A | * | 5/1980 | Inagaki et al. ................ 310/51 |
| 4,972,114 A | * | 11/1990 | Frister ......................... 310/263 |

FOREIGN PATENT DOCUMENTS

| | | |
|---|---|---|
| JP | 02-264153 | 10/1990 |
| JP | 5-19532 U | 3/1993 |
| JP | 7-127479 A | 5/1995 |
| JP | 7-298551 A | 11/1995 |
| JP | 08-014145 | 1/1996 |
| JP | 8-226527 A | 9/1996 |
| JP | 2000-295827 A | 10/2000 |
| JP | 2001-197713 A | 7/2001 |

* cited by examiner

*Primary Examiner*—Thanh Lam
(74) *Attorney, Agent, or Firm*—Sughrue Mion, PLLC

(57) ABSTRACT

A rotary electric machine for being mounted on an internal combustion engine of a vehicle or the like. The rotary electric machine includes a rotation shaft rotatably supported by a bracket; a rotor fixed to the rotation shaft; a stator which has a stator core disposed opposite to the outer periphery of the rotor and a stator winding mounted onto the stator core, and which is supported by the bracket; and a pulley engaged with an end of the rotation shaft to rotate integrally with the rotation shaft. The pulley and the rotation shaft are mutually engaged to form an engagement portion. The engagement portion includes a regulation means for regulating-sliding movement between the rotation shaft and the pulley in their peripheral direction.

3 Claims, 17 Drawing Sheets

ROTARY ELECTRIC MACHINE

BACKGROUND OF THE INVENTION

1. Field of the Invention

The present invention relates to a rotary electric machine mounted on, for example, an internal combustion engine of a vehicle.

2. Background Art

FIG. 18 is a sectional view showing the conventional rotary electric machine, for example, an AC generator for the vehicle. In the view, numeral 1 is a front bracket, numeral 2 is a rear bracket, and numeral 3 is a stator supported by the front bracket 1 and rear bracket 2, and which is structured by a stator core 4 and a stator winding 4 inserted in slots of the stator core 4.

Numeral 6 is a rotor whose both ends are fixed to a rotation shaft 7 supported by the front bracket 1 and the rear bracket 2, and is structured by the first rotor core 8, the second rotor core 9, a field coil 10 wound between both rotor cores 8 and 9, fans 11 and 12 provided on the back surface of both rotor cores 8 and 9, a pulley 13 provided outside of the front bracket 1 side of the rotation shaft 7, and a slip ring 14 which is provided inside of the rear bracket 2 side of the rotation shaft 7 and supplies the current to the field coil 10. The pulley 13 is engaged with one end of the rotation shaft 7, and connected to the rotation shaft 7 by a screw cut on one end of the rotation shaft 7 and a nut 20 screwed with that so that the pulley 13 can be rotated integrally with the rotation shaft 7.

Numeral 15 is a brush to supply the current to the slip ring 14, numeral 16 is a brush holder to hold the brush, numeral 17 is a rectifier to rectify the AC output of the stator winding 5, and numeral 18 is a regulator to adjust the current of the field coil 10 and to control the output voltage of the stator winding 5.

In the vehicle-use AC generator structured in this manner, the current is flowed from a battery, not shown, mounted on the vehicle to the field coil 10 through the brush 15 and slip ring 14, and when the rotor 6 is driven by the internal combustion engine through the pulley 13, the rotor 6 generates the rotating field, and this voltage is rectified by the rectifier 17 and supplied to the load, not shown.

However, in the conventional rotary electric machine, because the pulley 13 has the structure in which it is only engaged with the rotation shaft 7, there is a following problem. FIGS. 19A and 19B are typical view showing applied-ways of the running torque onto each position when the rotary electric machine is used as the generator. Because an engine is normally rotated clockwise, the clockwise drive force is transmitted to the pulley through a belt, and by the rotation shaft directly connected to the pulley, the generator is driven. As shown in FIG. 19A, at the time of the acceleration of the engine by the drive force of the belt, the pulley is rotated by the same clockwise torque as the engine, and the rotation shaft engaged with the pulley is also rotated by the clockwise torque in the same manner by being affected by the pulley. At this time, when the screw-thread cut on the rotation shaft is the right-handed screw, the nut to fix the pulley is rotated clockwise by the running torque of the rotation shaft and is in the fastening direction, therefore, there is no problem.

However, as shown in FIG. 19B, when the engine begins to be decelerated, the pulley has the force to resist the drive of the belt, that is, the counterclockwise torque reversed to the rotation of the engine. Because the pulley is only simply engaged with the rotation shaft, the pulley and rotation shaft are slidingly moved in the peripheral direction, and when the screw-thread cut on the rotation shaft is the right-handed screw, the nut to fix the pulley is rotated counterclockwise by the running torque and loosened, therefore, there is a problem that the rotation shaft is idly rotated.

Further, FIG. 20 is a typical view showing the applied way of the running torque onto each position when the rotary electric machine is used as a starter. The rotation shaft of the starter is rotated clockwise in the same direction as that of the engine, and the clockwise drive force is transmitted to the belt through the pulley, and the engine directly connected to the belt is driven. As shown in the drawing, at time of the start of the engine, the rotation shaft of the starter has the clockwise torque, and because the pulley is stopped initially, the pulley has the force to resist the rotation of the rotation shaft, that is, the counterclockwise torque reversed to the rotation of the rotation shaft. Because the pulley is only simply engaged with the rotation shaft, the pulley and rotation shaft are slidingly moved in the peripheral direction, and when the screw-thread cut on the rotation shaft is the right-handed screw, the nut to fix the pulley is rotated counterclockwise by the running torque and loosened, therefore, there is a problem that the rotation shaft is idly rotated. Particularly, in the vehicle in which an idling stop is adopted, because there, are many scenes to start the engine, the above problem becomes conspicuous.

SUMMARY OF THE INVENTION

The present invention is attained to solve the above problems, and the object of the present invention is to obtain a rotary electric machine by which the sliding movement between the pulley and the rotation shaft of the rotor is suppressed, the looseness of the nut to fix the pulley to the rotation shaft is prevented, and the idle rotation of the rotation shaft can be prevented.

A rotary electric machine according to an aspect of the invention includes a rotation shaft rotatably supported by a bracket; a rotor fixed to the rotation shaft; a stator which has a stator core disposed opposite to the outer periphery of the rotor and a stator winding mounted onto the stator core, and which is supported by the bracket; and a pulley engaged with an end of the rotation shaft to rotate integrally with the rotation shaft. The pulley and the rotation shaft are mutually engaged to form an engagement portion. The engagement portion includes a regulation means for regulating sliding movement between the rotation shaft and the pulley in their peripheral direction.

According to this aspect of the invention, the sliding movement between the pulley and rotation shaft is suppressed, and the loosening of the nut to fix the pulley to the rotation shaft is prevented and the idle rotation of the rotation shaft can be prevented.

A rotary electric machine according to another aspect of the invention includes a rotation shaft rotatably supported by a bracket; a rotor fixed to the rotation shaft; a stator which has a stator core disposed opposite to the outer periphery of the rotor and a stator winding mounted onto the stator core, and which is supported by the bracket; and a pulley engaged with an end of the rotation shaft to rotate integrally with the rotation shaft. A screw portion is formed on an end of the rotation shaft. A nut is engaged with the screw portion to secure the pulley to the rotation shaft. The screw portion is threaded so that the screw portion is fastened to the nut in a direction to which the torque of the rotation shaft is applied.

According to another aspect of the invention, the screw portion is threaded so that the screw portion is fastened to the nut in the direction opposite to the rotation direction of the rotation shaft.

According to these aspects of the invention, the loosening of the nut is prevented and the idle rotation of the rotation shaft can be prevented.

DETAILED DESCRIPTION OF THE PREFERRED EMBODIMENTS

Embodiment 1

Figure 1:
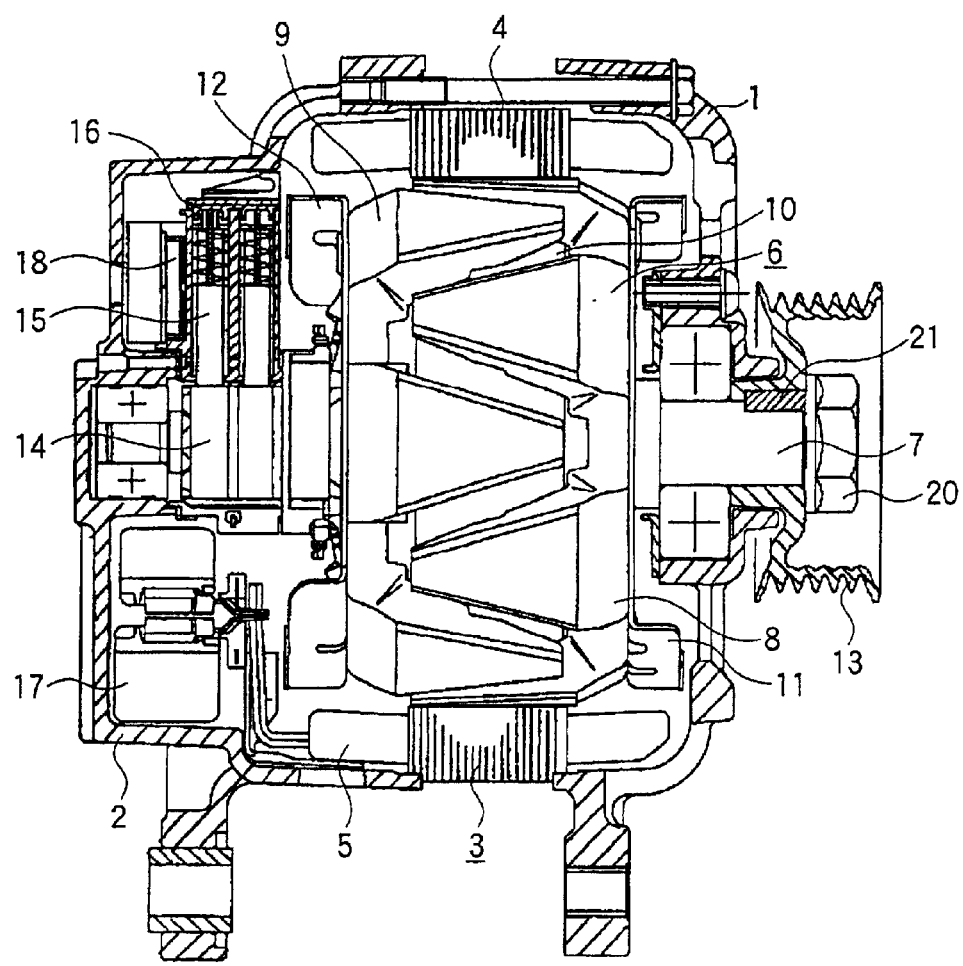
FIG. 1 is a sectional view showing a rotary electric machine according to the embodiment 1 of the present invention.
Figure 2A:
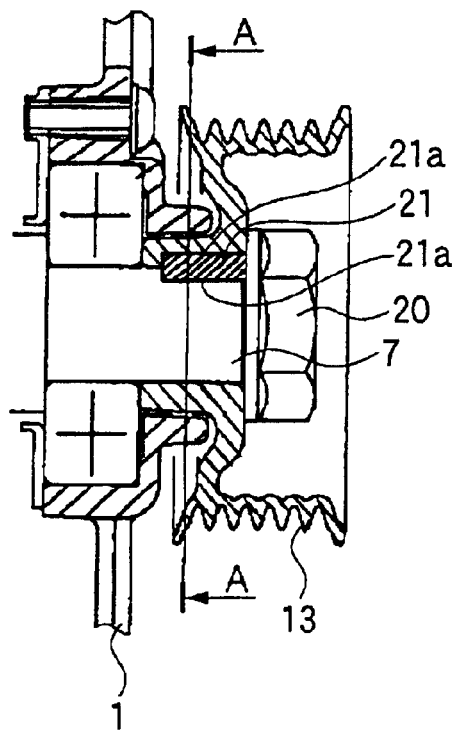
FIGS. 2A and 2B are sectional views in which an engagement portion of the rotation shaft with the pulley of the rotary electric machine according to the embodiment 1 of the present invention is enlarged.
Figure 2B:
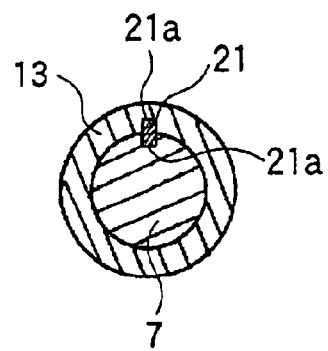

FIG. 1 is a sectional view showing a rotary electric machine, for example, a vehicle-use AC generator according to the embodiment 1 of the present invention, FIGS. 2A and 2B are sectional views in which an engagement portion of the rotation shaft and a pulley of the rotary electric machine in FIG. 1 is enlarged, and FIG. 2A is a side sectional view, and FIG. 2B is a sectional view in A—A line of FIG. 2A. In the view, numeral 1 is a front bracket, numeral 2 is a rear bracket, numeral 3 is a stator supported by the front bracket 1 and the rear bracket 2, and structured by a stator core 4 and a stator winding 5 inserted in slots of the stator core 4.

Numeral 6 is a rotor fixed on a rotation shaft 7 supported by the front bracket 1 and the rear bracket 2, and is structured by: the first rotor core 8; second rotor core 9; field coil 10 wound between both rotor cores 8 and 9; fans 11 and 12 provided on the rear surface of both rotor cores 8 and 9; pulley 13 provided outside of the front bracket 1 side of the rotation shaft 7; and slip ring 14 which is provided inside the rear bracket 2 side of the rotation shaft 7 and which supplies the current to the field coil 10. The pulley 13 is connected to the rotation shaft 7 by a screw whose thread is cut on one end of the rotation shaft 7, and a nut 20 screwed with it so that the pulley 13 can be integrally rotated the rotation shaft 7.

Numeral 15 is a brush to supply the current to the slip ring 14, numeral 16 is a brush holder to hold this brush 15, numeral 17 is a rectifier to rectify an AC output of the stator winding 5, and numeral 18 is a regulator to adjust the current of the field coil 10 and to control the output voltage of the stator winding 5.

In this connection, the rectifier 17 and regulator 18 are the necessary structure when the rotary electric machine is used as the vehicle-use AC generator, and when it is used as the vehicle-use start charging rotary electric machine to be accompanied by the start function of the engine, these are unnecessary.

In such the rotary electric machine, in the present embodiment, in the engagement portion of the rotation shaft 7 with the pulley 13, the regulation means for regulating the sliding movement in the peripheral direction of the rotation shaft 7 with the pulley 13 is provided. The regulation means has the structure in which a key 21 is inserted into a key groove 21a provided in the rotation shaft 7 and the pulley 13. Thereby, because the sliding movement in the peripheral direction of the rotation shaft 7 and pulley 13 is regulated, at the time of the engine deceleration, as described above, the loosening of the nut 20 by the sliding movement in the peripheral direction of the rotation shaft 7 and pulley 13 can be prevented.

In this connection, in the embodiment 1, it has the structure in which the key 21 is inserted into the key groove 21a provided in the rotation shaft 7 and the pulley 13, however, even when it is provided with the structure in which the key 21 is integrated with the rotation shaft 7, or the structure in which the key 21 is integrated with the pulley 13, it is needless to say that the same effect can be obtained.

Embodiment 2

Figure 3A:
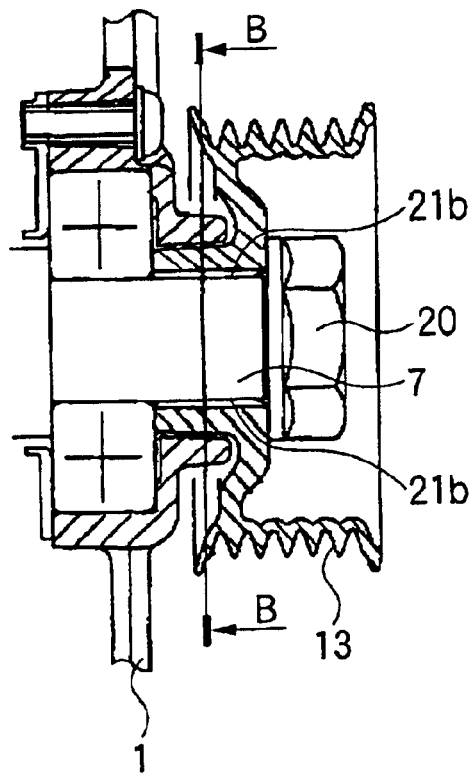
FIGS. 3A and 3B are sectional views in which an engagement portion of the rotation shaft with the pulley of the rotary electric machine according to the embodiment 2 of the present invention is enlarged.
Figure 3B:
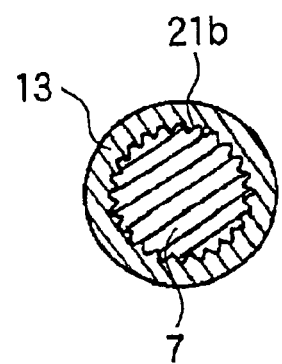

FIGS. 3A and 3B are sectional views in which an engagement portion of the rotation shaft and the pulley of the rotary electric machine in the embodiment 2 of the present invention is enlarged. FIG. 3A is a side sectional view, and FIG. 3B is a sectional view in B—B line of FIG. 3A. In the present embodiment, as the regulation means for regulating the sliding movement in the peripheral direction of the rotation shaft 7 and the pulley 13, in the engagement portion of the rotation shaft 7 and pulley 13, a spline 21$b$ is provided in the outer peripheral surface of the rotation shaft 7. Thereby, the sliding movement in the peripheral direction of the rotation shaft 7 and pulley 13 is regulated by the spline 21$b$, and the same effect as in the above embodiment 1 can be obtained.

In this connection, as the engagement method, there is a method in which the splines 21$b$ are respectively provided in the outer peripheral surface of the engagement portion of the rotation shaft 7 and the inner peripheral surface of the engagement portion of the pulley 13, and both splines 21$b$ are engaged, or a method in which the spline 21$b$ is provided in only the outer peripheral surface of the engagement portion of the rotation shaft 7, and the engagement portion of the pulley 13 formed in the inner diameter which is a little smaller than the outer diameter of the rotation shaft 7 is press-fitted and engaged.

Embodiment 3

Figure 4A:
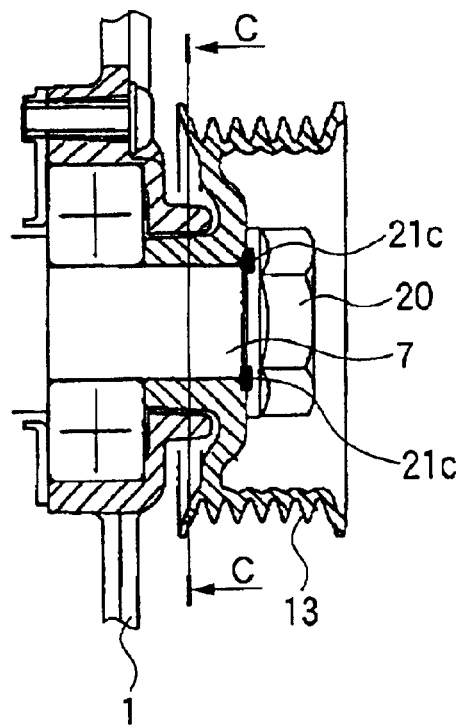
FIGS. 4A and 4B are sectional views in which an engagement portion of the rotation shaft with the pulley of the rotary electric machine according to the embodiment 3 of the present invention is enlarged.
Figure 4B:
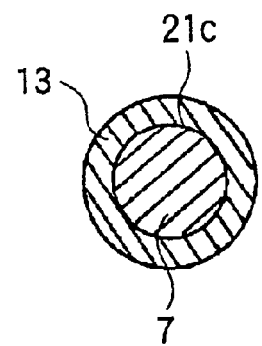

FIGS. 4A and 4B are sectional views in which an engagement portion of the rotation shaft and the pulley of the rotary electric machine according to the embodiment 3 of the present invention is enlarged, and FIG. 4A is a side sectional view, and FIG. 4B is a sectional view in C—C line of FIG. 4A. In the present embodiment, as the regulation means for regulating the sliding movement in the peripheral direction of the rotation shaft 7 and the pulley 13, in the engagement portion end surface of the rotation shaft 7 and pulley 13, the rotation shaft 7 and pulley 13 are welded by a method such as, for example, TIG welding. Thereby, the sliding movement in the peripheral direction of the rotation shaft 7 and pulley 13 is regulated by the welding portion 21$c$, and the same effect as in the above embodiment 1 can be obtained.

Embodiment 4

In the present embodiment, as the regulation means for regulating the sliding movement in the peripheral direction of the rotation shaft 7 and the pulley 13, the pulley 13 is press-fitted into the rotation shaft 7 and engaged. Thereby, the pressure caused by the press-fitting regulates the sliding movement in the peripheral direction of the rotation shaft 7 and the pulley 13, and the same effect as in the above embodiment 1 can be obtained. Further, when the welding in the above embodiment 3 and the press-fitting in the present embodiment are combinedly used, the further effect can be obtained.

Embodiment 5

In the present embodiment, as the regulation means for regulating the sliding movement in the peripheral direction of the rotation shaft 7 and the pulley 13, in the engagement portion end surface of the rotation shaft 7 with the pulley 13, a joint of the rotation shaft 7 and pulley 13 is filled up by conducting the caulking. Thereby, the sliding movement in the peripheral direction of the rotation shaft 7 and the pulley 13 is regulated, and the same effect as in the above embodiment 1 can be obtained.

Embodiment 6

As described above, the pulley 13 is connected to the rotation shaft 7 by the screw whose thread is cut on one end of the rotation shaft 7, and the nut 20 screwed with it so that the pulley 13 can be rotated integrally with the rotation shaft 7, however, in the present embodiment, the screw-thread cut on one end of this rotation shaft 7 is cut in the direction to which the torque of the rotation shaft 7 is largely applied.

For example, in the general vehicle-use AC generator, the maximum torque applied in the rotation normal direction of the rotation shaft 7 is about 10 N, in contrast to this, because the maximum torque applied in the rotation reversal direction of the rotation shaft 7 is about 40 N at the time of quick deceleration of the engine and 4 times, when the screw-thread is cut in the direction in which the torque of the rotation shaft 7 is largely applied, that is, in the reversal direction to the rotation direction of the rotation shaft 7, the loosening of the nut 20 can be securely prevented. Particularly, in the vehicle-use start charging rotary electric machine accompanied by the start function of the engine, at the time of the start of the engine, the torque of about 40–50 N which is 4–5 times of that at the time of the maximum power generation, is applied in the rotation reversal direction of the rotation shaft every start. Accordingly, it is vary effective to cut the screw-thread in the reversal direction to the rotation direction of the rotation shaft 7.

Embodiment 7

Figure 5:
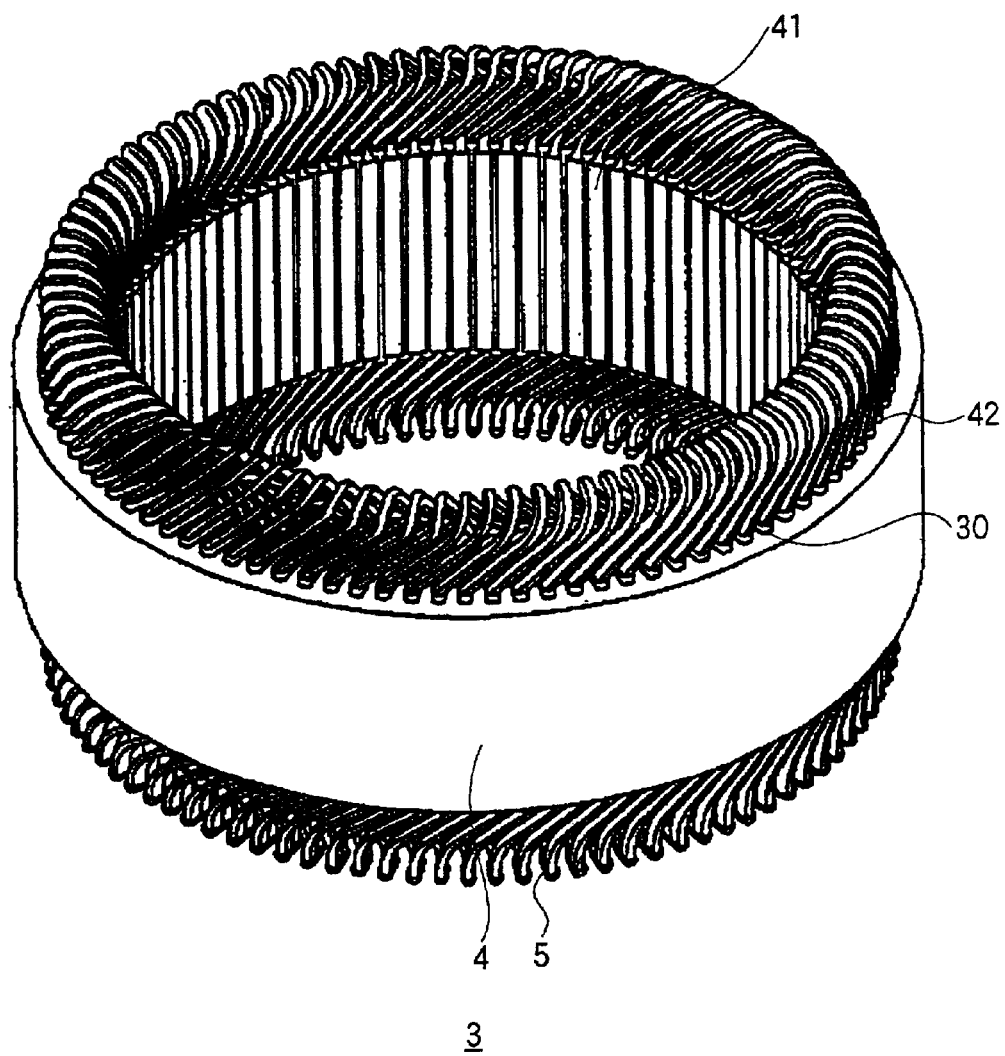
FIG. 5 is a perspective view showing the stator of the rotary electric machine according to the embodiment 7 of the present invention.

FIG. 5 is a perspective view showing a stator of the rotary electric machine according to the embodiment 7 of the present invention. As shown in the view, the stator 3 is provided with: a cylindrical stator core 4 in which a plurality of slots 42 extending in the axis direction are formed in the peripheral direction at a predetermined pitch; stator winding 5 wound around the stator core 4; and an insulating paper 30 which is mounted in each slot 42 and which electrically insulates the stator winding 5 and the stator core 4.

Figure 6:
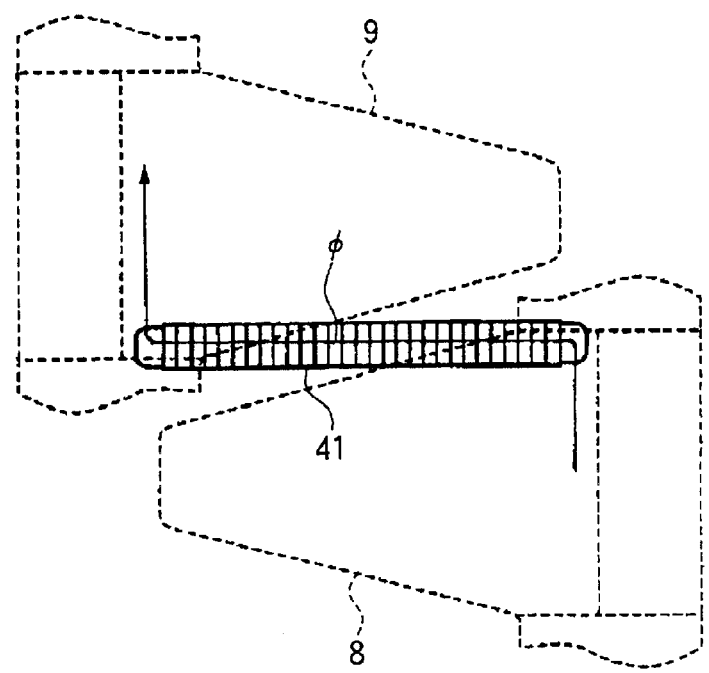
FIG. 6 is a plan view showing a pole piece of the rotor core of the rotary electric machine according to the embodiment 7 of the present invention.

It is desirable that the number of slots 42 in the stator core 4 of the rotary electric machine according to the present invention is 2 per every pole and every phase. FIG. 6 is a view showing a magnetic flux leaked from the pole piece of the first rotor core 8 in the rotor 6. As shown in the view, in the rotor 6 in which the pole piece of the first rotor core 8 and the second rotor core 9 and leading edge of teeth 41 are lapped in the diameter direction, the magnetic flux $\Phi$ which leaks from the pole piece of the first rotor core 8 to the pole piece of the second rotor core 9 through the teeth 41, exists.

However, when the number of slots is made 2 per every pole and every phase, because the width of the teeth 41 of the stator core 4 is small, unnecessary lapped amount of the pole piece of the first rotor core 8 and the second rotor core 9 and teeth 41 is reduced, and the magnetic flux $\Phi$ which leaks through the teeth 41 can be reduced. Accordingly, the torque ripple of the rotation shaft 7 can be reduced, and the loosening of the nut 20 can be prevented. Further, because the torque ripple of the rotation shaft 7 is small, the wearing of the regulation means for regulating the sliding movement in the peripheral direction as described above between the rotation shaft 7 and pulley 13 can be prevented.

Figure 7:
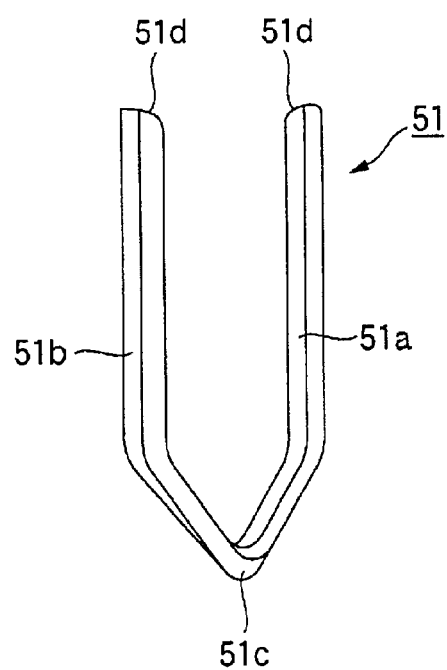
FIG. 7 is a perspective view showing a conductor segment structuring the stator winding of the rotary electric machine according to the embodiment 7 of the present invention.

In this connection, in order to realize the stator 3 in which the number of slots is 2 per every pole and every phase, when the stator winding 5 is structured by a conductor segment, it can be simply produced. FIG. 7 is a perspective view showing the conductor segment structuring the stator winding 5, and shows the condition before it is assembled to the stator core 4. In the view, the conductor segment 51 is formed into almost U letter shape in which the bar-like or plate-like metallic material (for example, copper) is folded at the turn portion 51$c$, and is structured by including the inner layer side conductor 51$a$ arranged on the inner periphery side of the slot 42 from the turn portion 51$c$, and the outer layer side conductor 51$b$ arranged on the outer periphery side of the slot 42 from the turn portion 51$c$.

Figure 8:
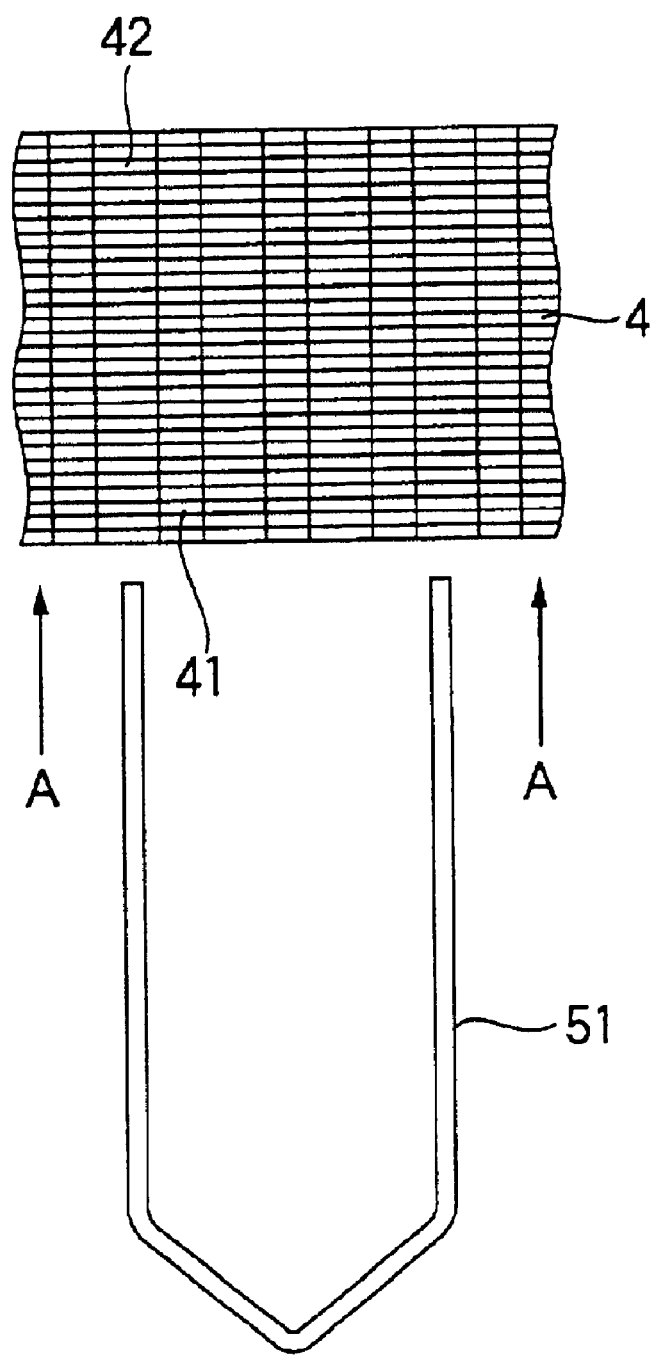
FIG. 8 is an illustration for explaining a production method of the stator winding of the rotary electric machine according to the embodiment 7 of the present invention.
Figure 9:
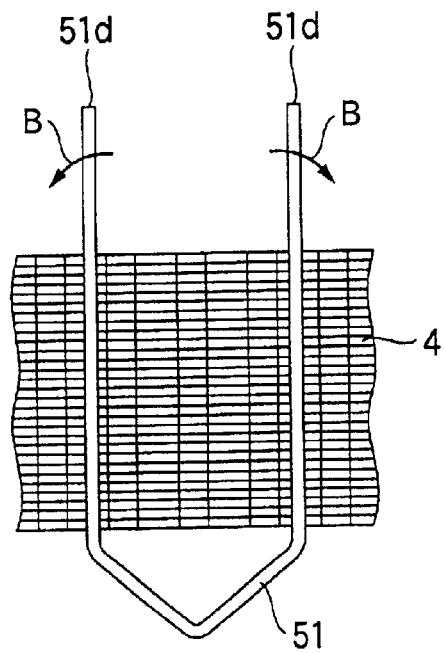
FIG. 9 is an illustration for explaining a production method of the stator winding of the rotary electric machine according to the embodiment 7 of the present invention.
Figure 10:
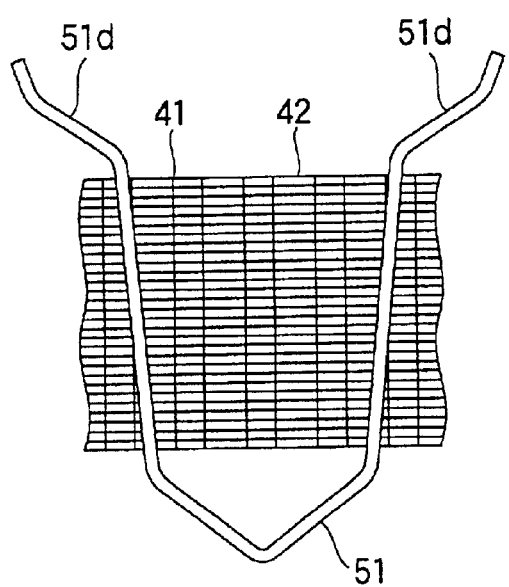
FIG. 10 is an illustration for explaining a production method of the stator winding of the rotary electric machine according to the embodiment 7 of the present invention.

FIGS. 8 to 10 are illustrations to explain a production method of the stator winding 5. In this connection, herein the insulating paper is neglected. The insulating paper is formed into the ring shape for 1 slot, and inserted along the axial direction into the slot 42. After the insulating paper is assembled into the slot 42, as shown in FIG. 8, the conductor segment 51 is inserted into the slot 42 in the axial direction as shown by an arrow A. After its end portion 51d is protruded from the other side surface of the slot 42, as shown in FIG. 9, the end portion 51d is respectively turned in the peripheral direction of the stator core 4 as shown by an arrow B (twist forming), and the inserted conductor segment 51 is in the situation of FIG. 10, and connected to the end portion 51d of the conductor segment 51 inserted into the different slot 42.

As described above, when the conductor segment 51 is used, because the conductor segment 51 is inserted from the axial direction of the stator core 4, there is an effect that, even when the space of the slot 42 is small, the winding is easy. In this connection, for the conductor segment 51, even when, other than the almost U letter shape as shown in above FIG. 7, various conductor segments such as almost J letter shape, or almost I letter shape are adopted, it is of course that the same effect can be obtained.

Embodiment 8

Figure 11:
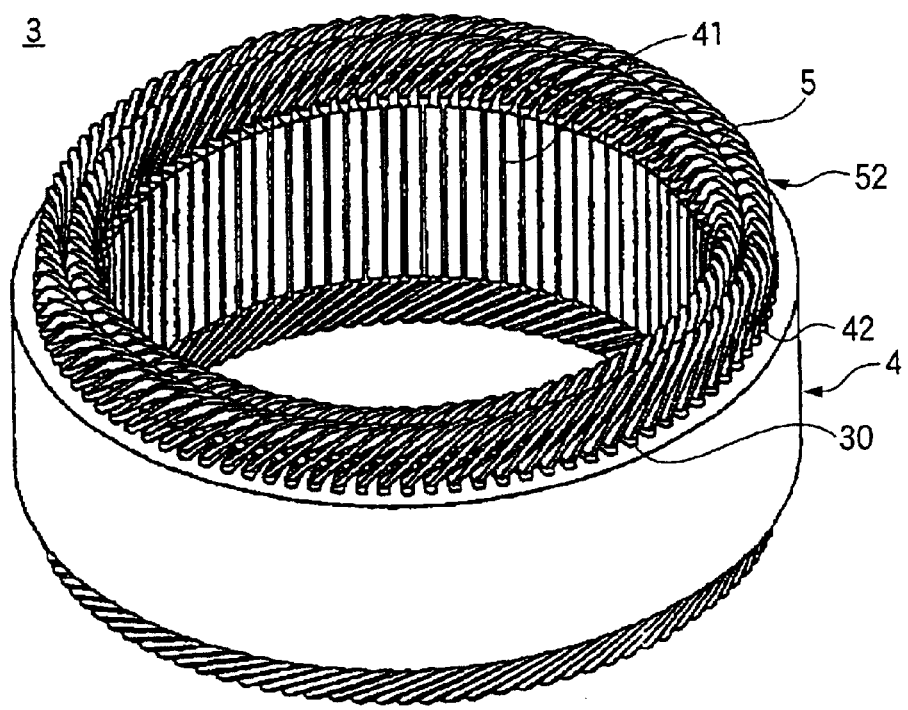
FIG. 11 is a perspective view showing the stator of the rotary electric machine according to the embodiment 8 of the present invention.

In the above embodiment 7, it is described that the stator winding 5 is structured by using the conductor segment 51. However, the stator winding 5 may be structured by a single wire (continuous wire). FIG. 11 is a perspective view showing the stator winding of the rotary electric machine according to the embodiment 8 of the present invention.

The stator 3 has, as shown in FIG. 11, the stator core 4 formed of a cylindrical laminating core in which a plurality of slots 42 extending in the axial direction are formed at a predetermined pitch, stator winding 5 wound around the stator core 4, and insulating paper 30 electrically insulating the stator winding 5 mounted in each slot 42 and the stator core 4. Then, the stator winding 5 has a plurality of windings in which a wire 52 is turned back at the outside of the slot 42 on the end surface side of the stator core 4, and is wound by the wave winding in such a manner that the inner layer and outer layer are alternately applied in the slot depth direction in the slots 42 for each predetermined number of slots.

Figure 12:
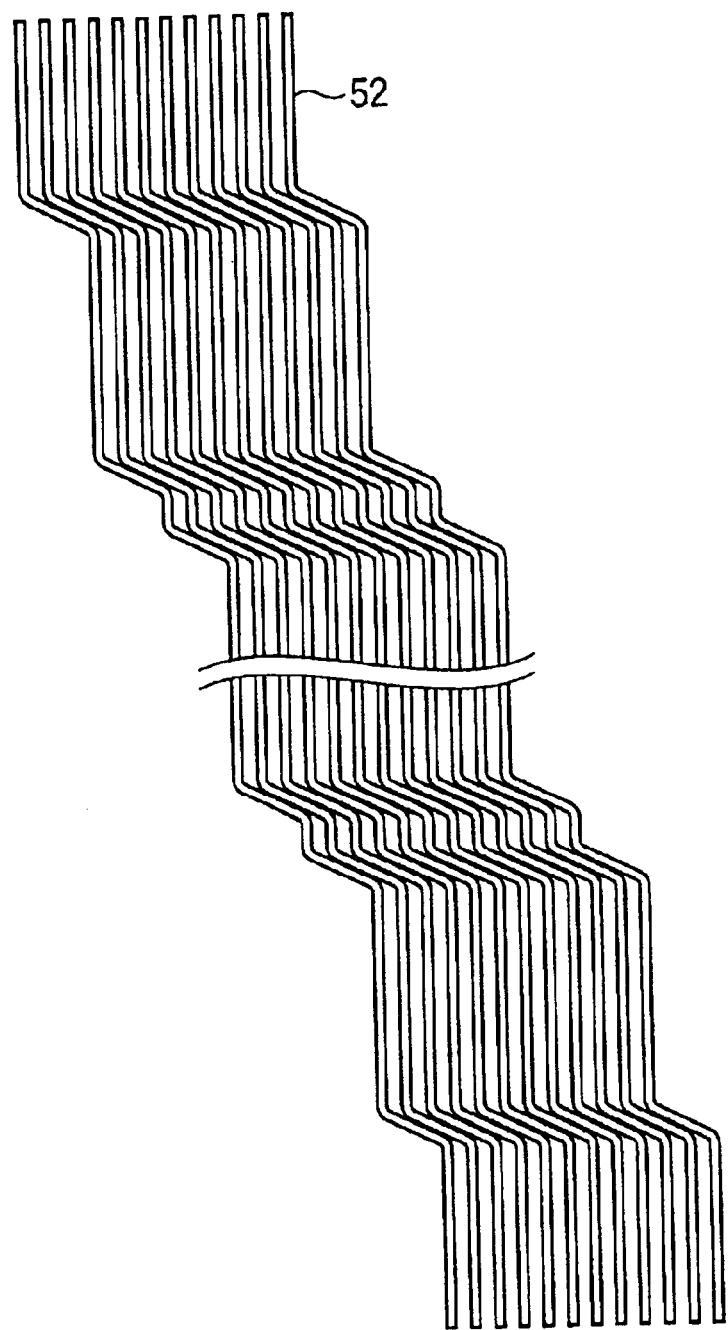
FIG. 12 is an illustration for explaining a production method of the stator winding of the rotary electric machine according to the embodiment 8 of the present invention.
Figure 13:
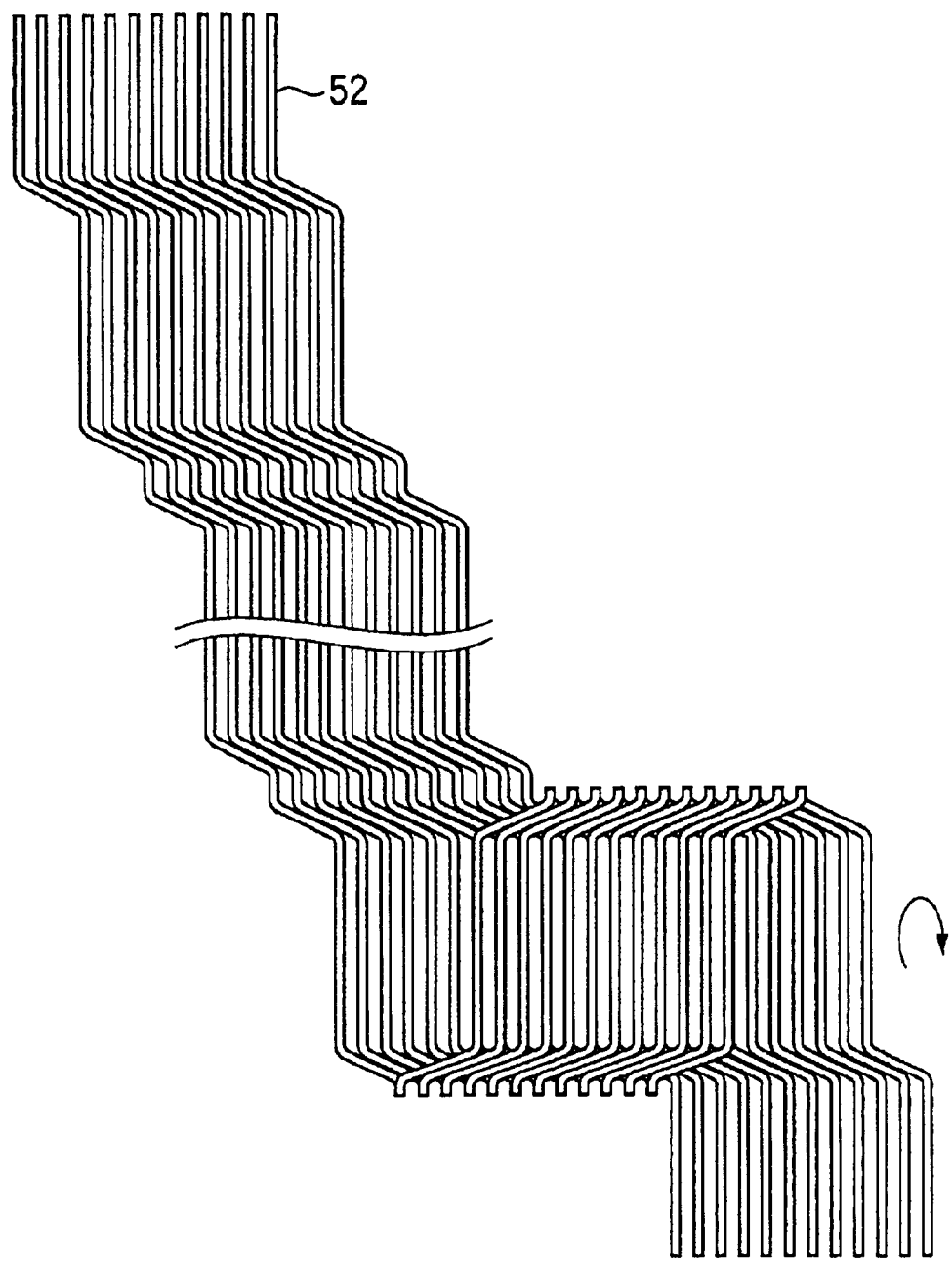
FIG. 13 is an illustration for explaining a production method of the stator winding of the rotary electric machine according to the embodiment 8 of the present invention.
Figure 14:
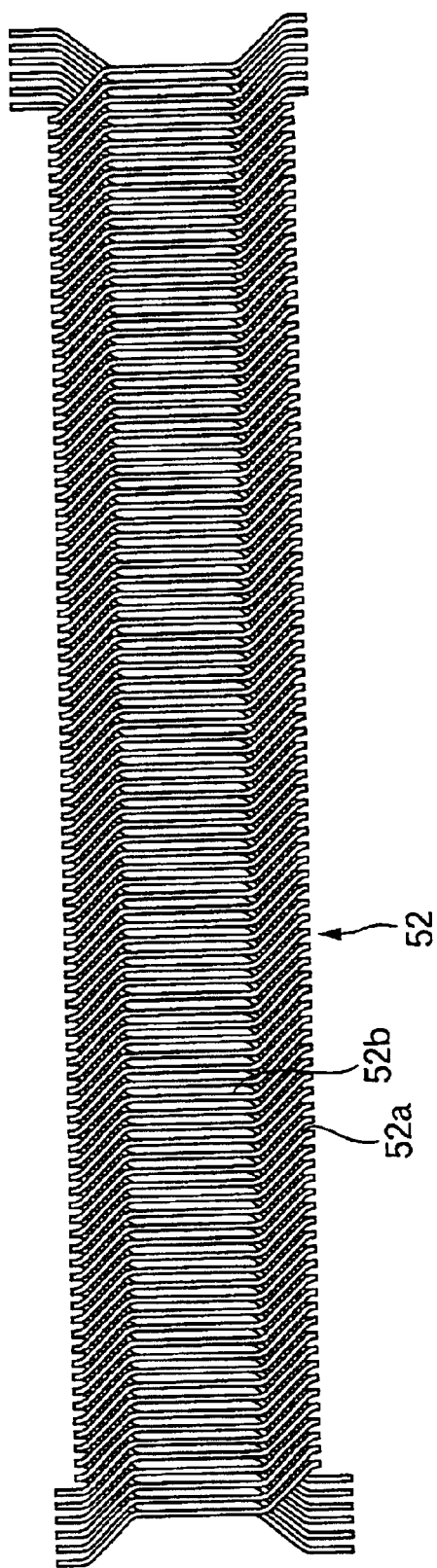
FIG. 14 is an illustration for explaining a production method of the stator winding of the rotary electric machine according to the embodiment 8 of the present invention.
Figure 15:
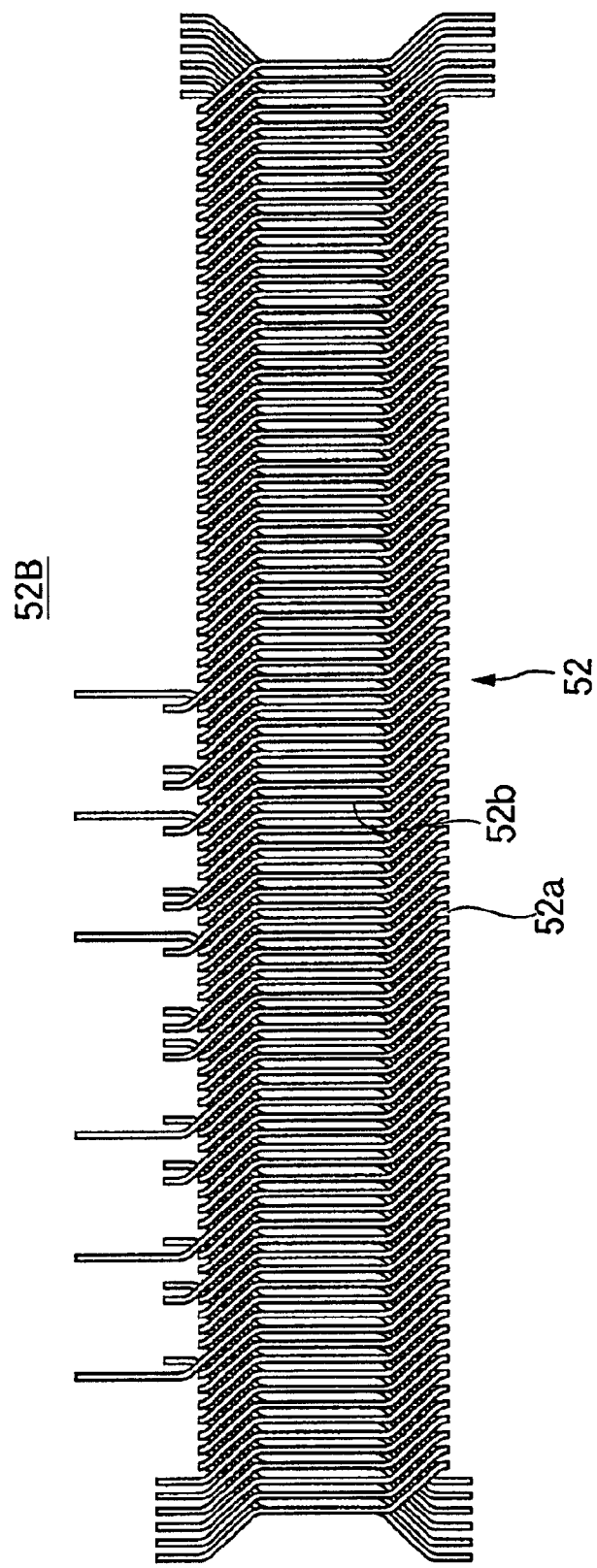
FIG. 15 is an illustration for explaining a production method of the stator winding of the rotary electric machine according to the embodiment 8 of the present invention.
Figure 16:
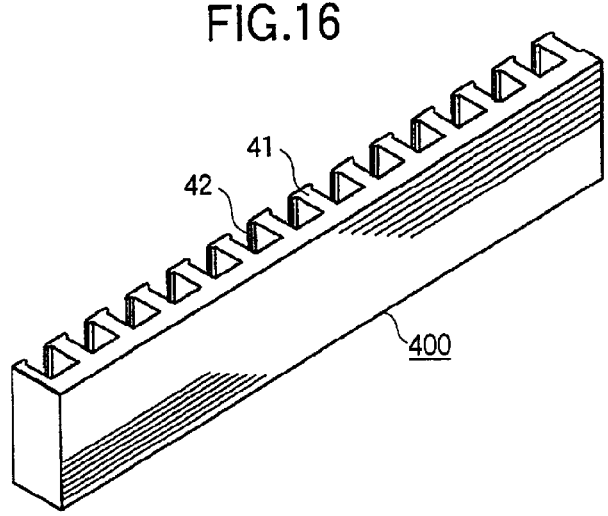
FIG. 16 is an illustration for explaining a production method of the stator winding of the rotary electric machine according to the embodiment 8 of the present invention.
Figure 17:
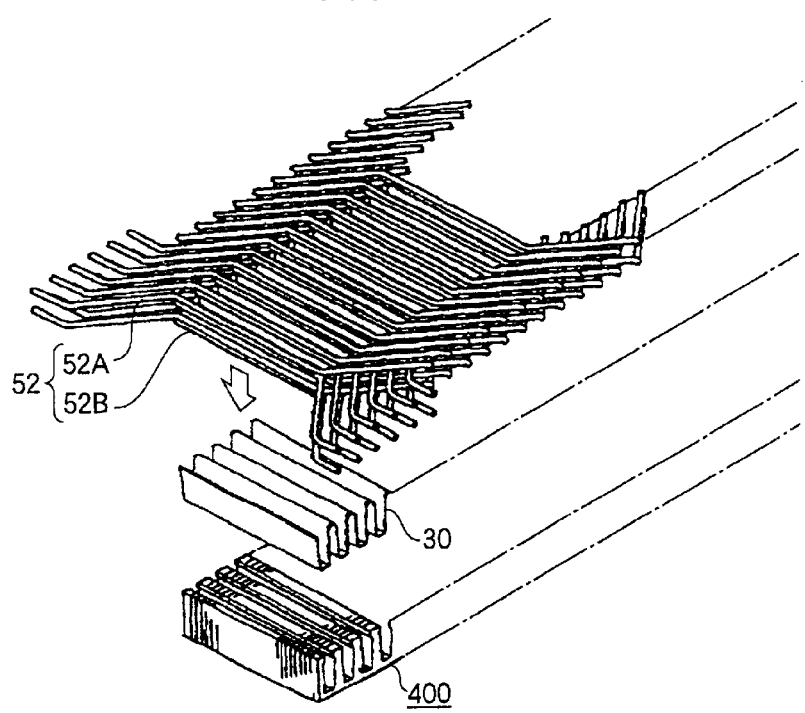
FIG. 17 is an illustration for explaining a production method of the stator winding of the rotary electric machine according to the embodiment 8 of the present invention.
Figure 18:
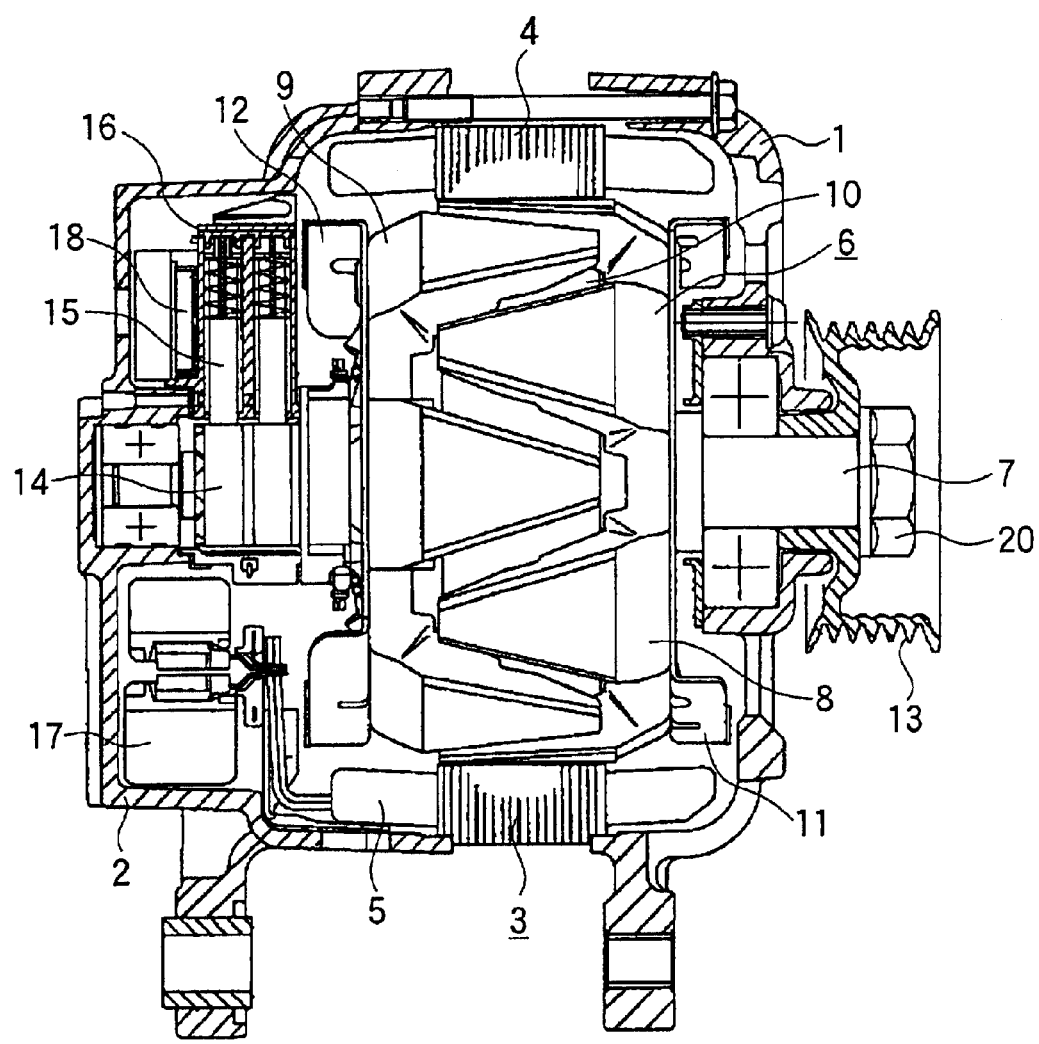
FIG. 18 is a sectional view showing the conventional rotary electric machine.
Figure 19A:
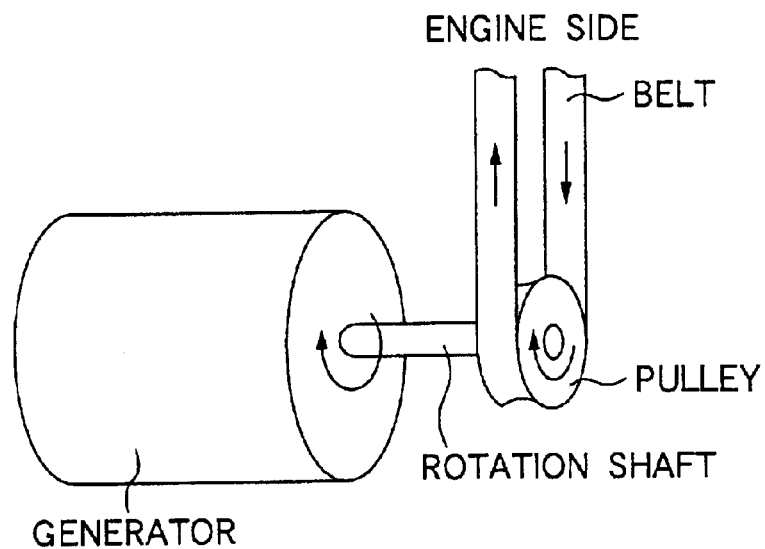
FIGS. 19A and 19B are typical views showing the applied-ways of the torque of the rotary electric machine.
Figure 19B:
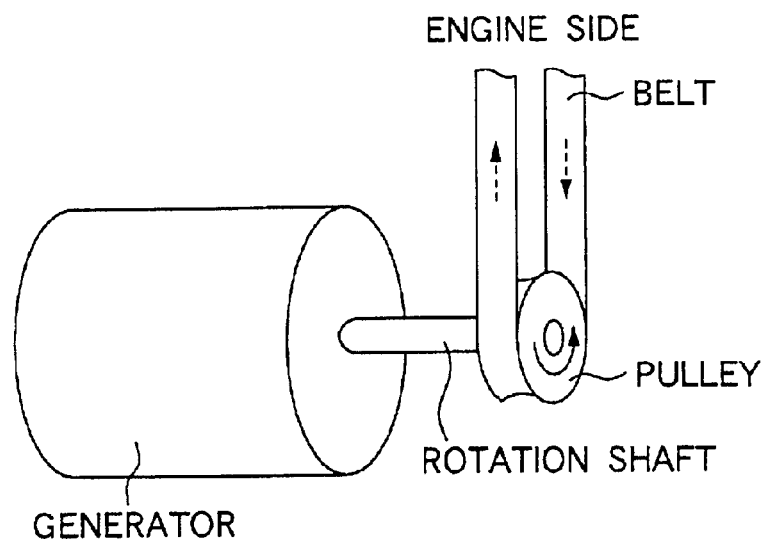
Figure 20:
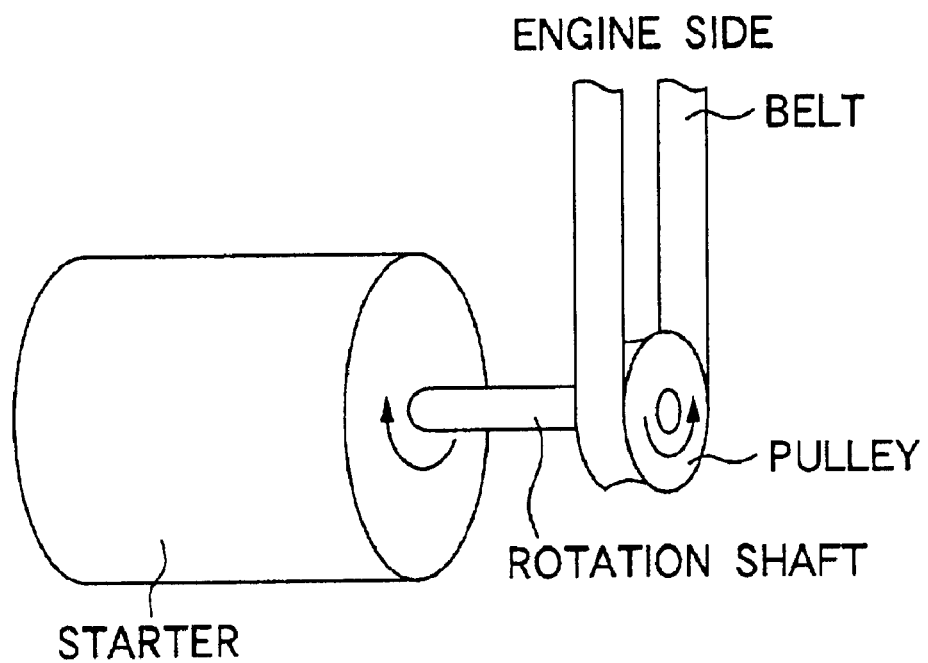
FIG. 20 is a typical view showing the applied-way of the torque of the rotary electric machine.

Next, referring to FIG. 12 to FIG. 17, a production method of the stator 3 will be specifically detailed. Initially, as shown in FIG. 12, 12 long size wires 52 are simultaneously folded into the lightning-shape on the same plane and formed. Next, as shown by an arrow in FIG. 13, it is folded in the right-angled direction by a tool, and the wire group 52A shown in FIG. 14, are produced. Further, in the same manner, as shown in FIG. 15, the wire group 52B having a transition wiring and lead wire are produced. The wire groups 52A and 52B are structured in such a manner that a wire pair in which 2 wires 52 formed in this pattern are shifted as shown in FIG. 17 by 6-slot pitches and the straight line portions 52b are arranged by being overlapped, are structured when the wire pair are shifted for every 1 slot pitch and 6 pairs are arranged. Then, every 6 end portions of the wires 52 are extended on both sides of both ends of the wire groups 52A and 52B. Further, the turn portions 52a are aligned and arranged on both side portions of the wire groups 52A and 52B.

On the one hand, main lamination plates in which trapezoid-shaped slot 42 and teeth 41 are formed by a predetermined pitch, are laminated by predetermined number of sheets, and further, predetermined positions of its outer peripheral portion are laser-welded in the lamination direction, and as shown in FIG. 16, a lamination core 400 of almost rectangular parallelepiped is produced.

Then, as shown in FIG. 17, the insulating paper 30 and 2 wire groups 52A and 52B are overlapped and mounted to the lamination core 400. Next, the lamination core 400 is rounded, and both of its end surfaces are made in contact with each other and welded, and as shown in FIG. 11, a cylindrical stator 3 is obtained.

Thereby, the coil end of the stator winding 5 can be lowered, and the cooling window from the fans 11, 12 respectively provided on the rear surface of the first rotor core 8 and second rotor core 9 smoothly flows to the coil end periphery, and an effect that the cooling efficiency can be increased, is obtained.

In this connection, when the structure of the regulation means in the present invention is a structure by which the object to regulate the sliding movement in the peripheral direction of the rotation shaft 7 and pulley 13, can be attained, it is of course that the structure other than that described in each embodiment may be allowable.

Further, in each above embodiment, the present invention is described by assuming that the present invention is applied to the vehicle-use AC generator, however, even when the present invention is applied to the vehicle-use start charging rotary electric machine in which the starter motor to start the engine, and the charging generator are integrated with each other, it is needless to say that the same effect can be obtained.

As described above, according to an aspect of the invention, the rotary electric machine has: a rotation shaft rotatably supported by a bracket; a rotor fixed to the rotation shaft; a stator which has a stator core arranged opposite to the outer periphery of the rotor and a stator winding mounted onto the stator core, and which is supported by the bracket; and a pulley which is rotatably engaged integrally with the rotation shaft, onto the one end of the rotation shaft, and by which the motive power is transmitted in the both ways between the engine and it, and a regulation means for regulating the sliding movement in the peripheral direction of the rotation shaft and pulley is provided on the engagement portion of the rotation shaft with the pulley, therefore, an effect in which the sliding movement between the pulley and rotation shaft is suppressed, and the loosening of the nut to fix the pulley to the rotation shaft is prevented and the idle rotation of the rotation shaft can be prevented, can be obtained.

Further, according to another aspect of the invention, the rotary electric machine has: a rotation shaft rotatably supported by a bracket; a rotor fixed to the rotation shaft; a stator which has a stator core arranged opposite to the outer periphery of the rotor and a stator winding mounted onto the stator core, and which is supported by the bracket; and a pulley which is mounted onto the one end of the rotation shaft so that it is rotatably engaged integrally with the rotation shaft, and which is fixed by a screw portion provided on one end of the rotation shaft and a nut engaged with the screw portion, and by which the motive power is transmitted in two ways between the engine and it, and because the thread of the screw portion is cut so that the screw portion is fastened in the direction to which the torque of the rotation shaft is largely applied, an effect that the loosening of the nut to fix the pulley to the rotation shaft is prevented and the idle rotation of the rotation shaft can be prevented, can be obtained.

Further, according to another aspect of the invention, the rotary electric machine has: a rotation shaft rotatably supported by a bracket; a rotor fixed to the rotation shaft; a stator which has a stator core arranged opposite to the outer periphery of the rotor and a stator winding mounted onto the stator core, and which is supported by the bracket; and a pulley which is mounted onto the one end of the rotation shaft so that it is rotatably engaged integrally with the rotation shaft, and which is fixed by a screw portion provided on one end of the rotation shaft and a nut engaged with the screw portion, and by which the motive power is transmitted in two ways between the engine and it, and because the thread of the screw portion is cut so that the screw portion is fastened in the direction opposite to the rotation direction of the rotation shaft, an effect that the loosening of the nut to fix the pulley to the rotation shaft is prevented and the idle rotation of the rotation shaft can be prevented, can be obtained.

What is claimed is:

1. A rotary electric machine comprising:

a rotation shaft rotatably supported by a bracket;

a rotor fixed to the rotation shaft;

a stator which has a stator core arranged opposite to the outer periphery of the rotor and a stator winding mounted onto the stator core, and which is supported by the bracket;

a pulley engaged with an end of the rotation shaft to rotate integrally with the rotation shaft;

a screw portion formed on an end of the rotation shaft; and a nut to be engaged with the screw portion to secure the pulley to the rotation shaft;

wherein the screw portion is threaded so that the screw portion is fastened to the nut in the direction opposite to the rotation direction of the rotation shaft.

2. The rotary electric machine according to claim 1, wherein the pulley and the rotation shaft are mutually engaged to form an engagement portion, and the engagement portion includes a regulation means for regulating sliding movement between the rotation shaft and the pulley in their peripheral direction.

3. The rotary electric machine according to claim 2, wherein the regulation means comprises:

a pair of key grooves provided in the rotation shaft and the pulley respectively; and a key to be inserted into the key grooves.

* * * * *